US009202038B1

(12) United States Patent
Allen

(10) Patent No.: US 9,202,038 B1
(45) Date of Patent: Dec. 1, 2015

(54) RISK BASED AUTHENTICATION

(71) Applicant: Amazon Technologies, Inc., Reno, NV (US)

(72) Inventor: Nicholas Alexander Allen, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 67 days.

(21) Appl. No.: 13/858,792

(22) Filed: Apr. 8, 2013

(51) Int. Cl.
*G06F 7/04* (2006.01)
*G06F 21/40* (2013.01)

(52) U.S. Cl.
CPC .................................... *G06F 21/40* (2013.01)

(58) Field of Classification Search
USPC ..................................................... 726/26–30
See application file for complete search history.

(56) References Cited

U.S. PATENT DOCUMENTS

| | | | |
|---|---|---|---|
| 7,490,356 B2* | 2/2009 | Lieblich et al. | 726/25 |
| 8,910,251 B2* | 12/2014 | Shepard et al. | 726/5 |
| 2005/0172335 A1* | 8/2005 | Aday et al. | 726/10 |
| 2009/0210924 A1* | 8/2009 | Maurer et al. | 726/2 |
| 2011/0231913 A1* | 9/2011 | Feng et al. | 726/7 |
| 2012/0297205 A1* | 11/2012 | Yuen et al. | 713/193 |
| 2013/0254875 A1* | 9/2013 | Sama | 726/19 |
| 2014/0109220 A1* | 4/2014 | Inkumsah et al. | 726/19 |
| 2014/0115670 A1* | 4/2014 | Barton et al. | 726/4 |

OTHER PUBLICATIONS

Li et al., "Breaking e-banking CAPTCHAs," ACSAC '10: Proceedings of the 26th Annual Computer Security Applications Conference on cember 2010, pp. 171-180.*
Lin et al., "A novel approach for re-authentication protocol using personalized information," Machine Learning and Cybernetics (ICMLC), 2012 International Conference on Year: 2012 pp. 1826-1829.*

* cited by examiner

*Primary Examiner* — Roderick Tolentino
(74) *Attorney, Agent, or Firm* — Baker & Hostetler LLP

(57) ABSTRACT

A method for authenticating a request for access to resources is described. A request for access to a resource is received from a user, and the user accesses a proof-of-work challenge. An adjustment factor associated with the user is determined. The adjustment factor may be generated as a function of a password associated with the user and the requested resource. The proof-of-work challenge may have a complexity that is determined based on the adjustment factor. A selected password and a solution to the proof-of-work challenge are received from the user. It is determined whether the received solution is correct based on the determined adjustment factor.

23 Claims, 8 Drawing Sheets

RISK BASED AUTHENTICATION

BACKGROUND

Computer crimes, unwanted communications, compromised data, and malware have continuously increased as networked communications continue to grow at tremendous rates. With the growth of communication networks such as the Internet, the increasing amount of data interchange, and the recent growth of cloud computing, the vulnerability of computers and servers through networked communication has become an increasingly significant issue. Services that control access to systems and data stored thereon must avoid allowing access to hackers and other unauthorized users, while allowing legitimate users to access the services. A login service is typically used to control access to a wide variety of information systems.

The username and password-based login process are among the more common types of login services. When using this process, a user typically presents a username and a representation of a secret password to provide evidence that they are the authorized owner of an identity associated with the username. An attacker may attempt to gain unauthorized access by guessing the username and/or secret password. The login service may attempt to prevent such attacks by slowing down the rate at which guesses can be made, such as by making login attempts computationally expensive, limiting the number of attempts that can be made, or employing a challenge-response system (e.g., CAPTCHA) to require human intervention for an attempt. These techniques may unnecessarily impact legitimate users of the system.

DETAILED DESCRIPTION

In various embodiments, this disclosure describes systems and methods for providing a risk-based authentication service. The risk-based authentication service may receive a request for access to restricted services and respond to the request with a variable-strength but publicly-determinable proof-of-work challenge. The complexity of the proof-of-work challenge may be adjustable and may be based on the riskiness of the attempt. The proof-of-work challenge may be an algorithmic problem that can be solved with a moderate amount of effort but can be verified with little effort. The risk-based authentication service may publish a risk function that may be used to rank or score the riskiness of an access attempt. A requestor may receive from the risk-based authentication service a randomly generated proof-of-work challenge expressed at a base strength that can be increased based on the riskiness score. The base strength may correspond to a base complexity level or an initial complexity level for the proof-of-work challenge. The requestor may execute or evaluate the risk function based on one or more factors associated with the access attempt. For example, the requestor may use the login password as an input to the risk function. The requestor may increase the strength of the proof-of-work challenge based on the risk function result, and the requestor may solve the adjusted proof-of-work challenge. The requestor may send the solution to the risk-based authentication service. The risk-based authentication service may validate the solution based on the adjusted proof-of-work challenge and authenticate the request.

Figure 1:
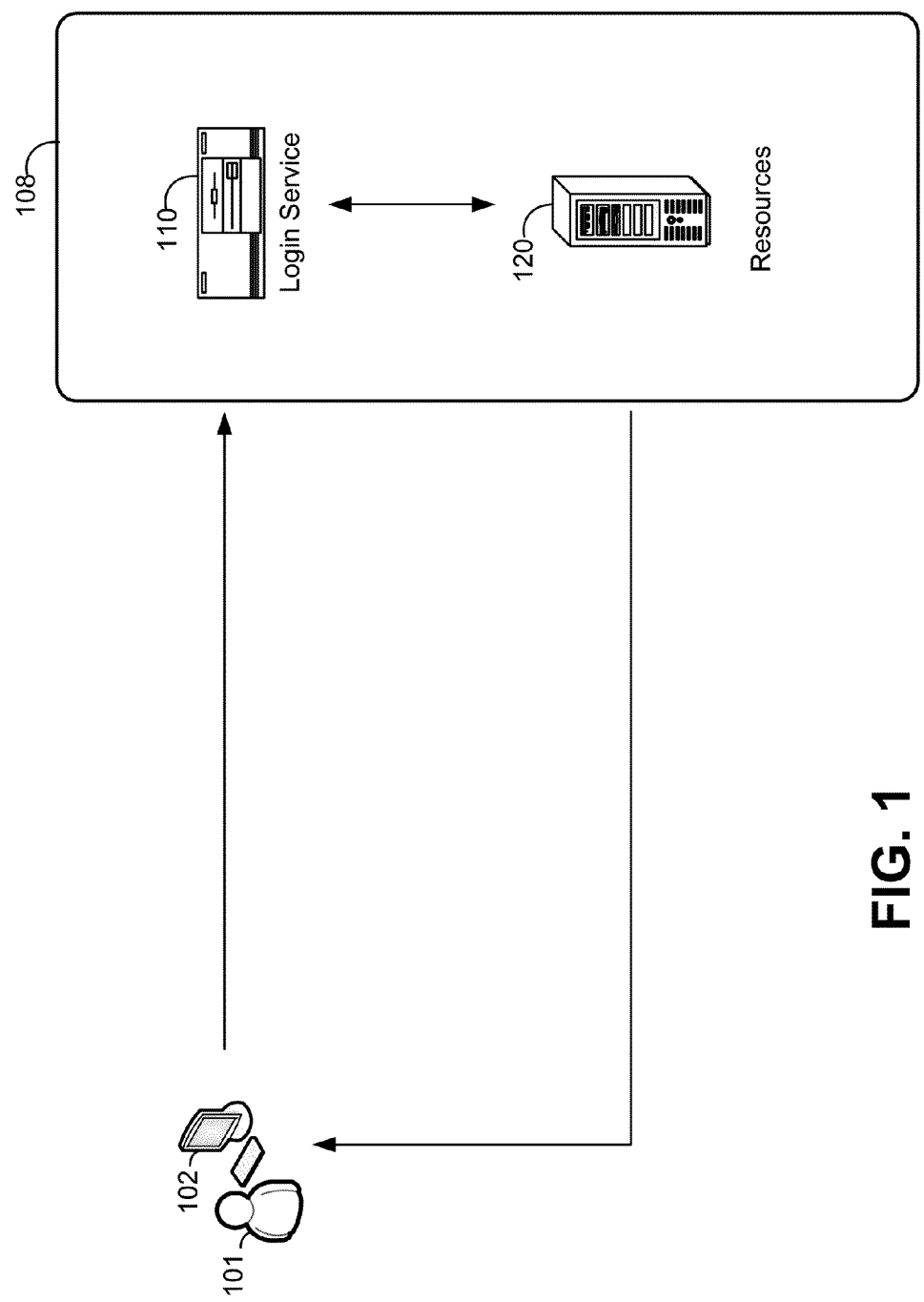
FIG. 1 is a diagram illustrating a risk-based authentication service in accordance with the present disclosure.

FIG. 1 illustrates one example embodiment of a risk-based authentication service in accordance with the present disclosure. FIG. 1 illustrates a login service 110 and resources 120 provided by a service provider network 108. The login service 110 may be configured to provide risk-based authentication services to users such as computer user 101 operating a computing device 102. Computer user 101 may desire to access resources 120 which may include resources that are restricted to authorized users. A login request may be sent to login service 110. Login service 110 may receive the login request and send a proof-of-work challenge to computer user 101. In some embodiments, the login service 110 may also send a risk function to computer user 101. Alternatively, the risk function may be accessed from a publicly available source such as a web site. Computer user 101 may access or receive, using computing device 102, the risk function. Computer user 101 may select a password and the risk function may provide a risk score based on the selected password. In some embodiments, the risk score may be indicative of a complexity or riskiness of the password. The risk score may be used to increase the strength or difficulty of the proof-of-work challenge. The computer user 101 may, using computing device 102, solve the adjusted proof-of-work challenge and send the solution and the entered password to the login service 110. The login service 110 may have access to a previously stored password associated with computer user 101, or a password that has been previously established and associated with the computer user 101 and that is accessible to the login service 110. The established password may have been previously selected by the computer user 101 when setting up permissions to access resource 120, or may have otherwise been established prior to the login request. The login service 110 may independently score the riskiness of the stored password. Alternatively, the login service 110 may access a previously determined risk score for the stored password. Based on the risk score independently determined by the login service 110, the login service 110 may determine the appropriate strength level of the proof-of-work challenge and validate the received solution. The login service 110 may also authenticate computer user 101 using the selected password.

Figure 2:
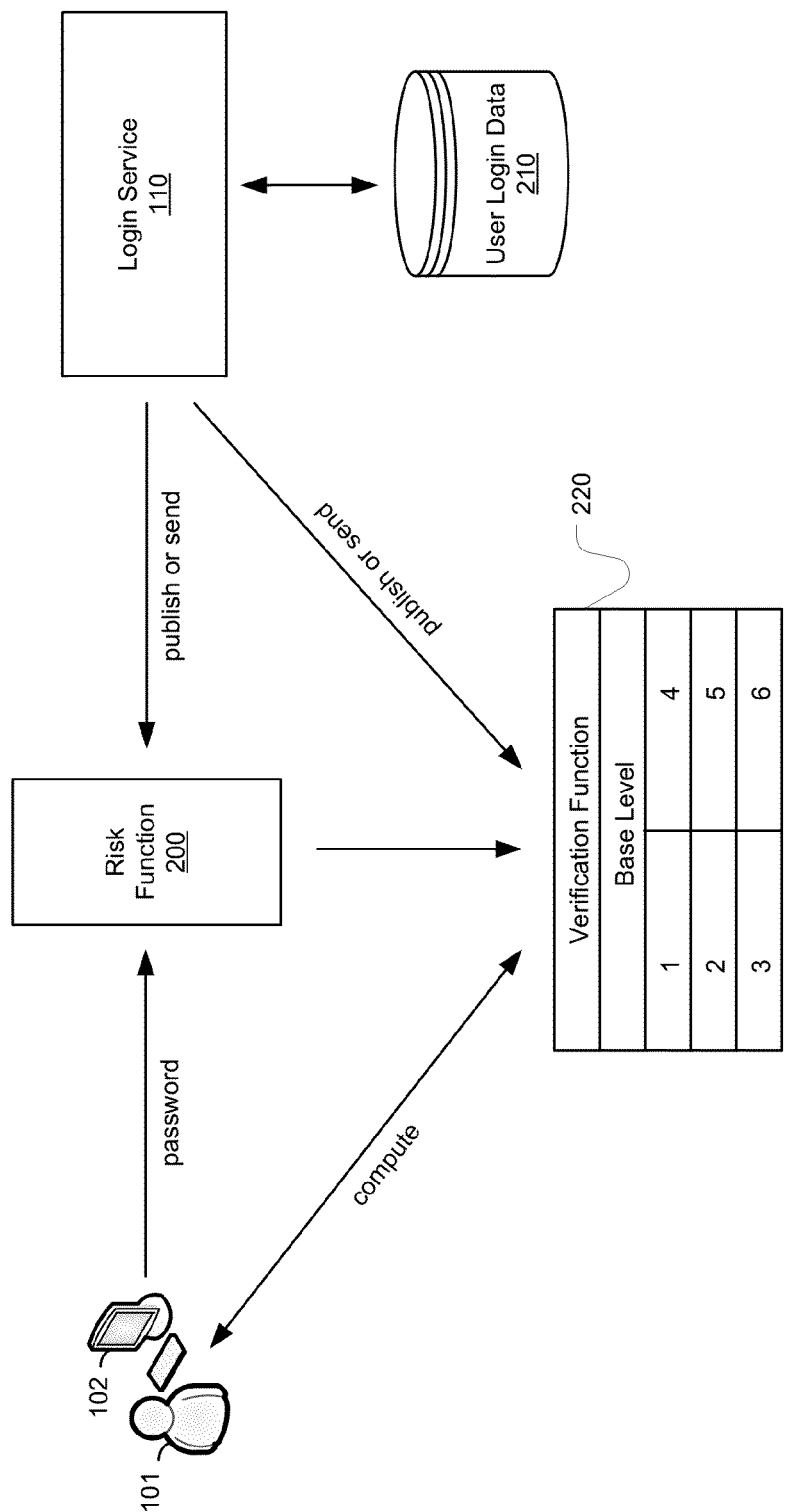
FIG. 2 is a diagram illustrating various components of a risk-based authentication framework in accordance with the present disclosure.

FIG. 2 illustrates various components of one example embodiment of a risk-based authentication service in accordance with the present disclosure. The login service 110 may provide a risk-based authentication service as described above. The login service 110 may publish or otherwise make available a risk function 200 that may be used to score the riskiness of an access attempt. In one embodiment, the risk function 200 may be sent to computer user 101 via computing device 102 when the computer user 101 attempts to access services via login service 110. In other embodiments, the risk function 200 may be made available via a publicly accessible web site or published via traditional means (e.g., a printed publication). The computer user 101 may execute the risk function 200 using a password for accessing the requested resource. The password may be associated with the user and the request resource, and in some embodiments may be stored in a data store for user login data 210.

Computer user 101 may also receive, from the login service 110, a verification function 220. In some embodiments, the verification function 220 may be a proof-of-work challenge expressed at a base strength as described above. The verification function 220 may be any function that requires some computation effort by the computer user 101, typically requiring computing resources. The verification function 220 may be selected by the login service 110 and in one embodiment, the verification function 220 may be randomly generated. The computer user 101 may receive the verification function 220 as part of a response to initiating the login attempt. As shown in FIG. 2, the verification function 220 may have a base strength or level, and may also have additional levels, such as levels 1 through 6 in this example. Each of the levels may change the complexity of the verification function 220 and/or change the amount of computational effort required to solve the verification function 220. The computer user 101 may, using the computing device 102, evaluate the risk function 200 based at least in part on a password that the computer user 101 will use for the login attempt. The risk function 200 may compute an adjustment factor that may correspond to one of the levels of verification function 220. The adjustment factor may represent a risk associated with the login attempt. The computer user 101 may solve, using computing device 102, the verification function 220 after adjusting the level based on the adjustment factor.

The computer user 101 may transmit login information to the login service including the solution to the verification function 220. The login service 110 may validate the login information and the solution. In some embodiments, the login service 110 may look up a stored adjustment factor for the username associated with the login attempt in user login data store 210. The login service may validate that the solution correctly solves the verification function 220 based on using the stored adjustment factor.

In general, challenge-response tests may be used in authentication systems as part of a process for ensuring that a request for a protected resource is legitimate. The use of user passwords is a common method of authenticating a user's request for resources. A password is typically a string of characters that may be used to authenticate a user's identity and provide approval to access a resource. In order to provide access in a secure manner, the password should not be easily guessed or generated, otherwise an illegitimate requestor may generate enough guesses to arrive at the user's password. The use of computers can be used to greatly increase the speed with which such guesses can be generated. It is thus desirable that users select complex passwords because the more complex a user's password, the more difficult it will be to guess the password. However, it has been historically difficult to cause users to generate and use complex passwords, thereby increasing the risk that an illegitimate user may gain access to the user's protected resources.

Login services may use challenge-response tests to limit an illegitimate requestor's ability to guess a user's password. A challenge-response test may involve asking a requestor to respond to a test. The requestor's response may be evaluated to determine if the challenge-response test was correctly solved. The challenge-response test may be designed to be easy to generate and validate, but more difficult for a computer to solve. If a correct solution is received, it can be presumed to have been entered by a legitimate user. A common type of challenge-response test is the use of CAPTCHA, which requires the user to type letters and/or digits from a distorted image that is displayed.

Generally, a challenge-response test may be considered one type of a proof-of-work system. A proof-of-work system provides a way to deter unauthorized access to protected resources. A proof-of-work system may provide a proof-of-work challenge or problem such as a challenge-response test that requires processing effort by a computer. Some proof-of-work systems may issue a challenge or problem that is characterized by asymmetry, where the work required to solve the challenge or problem requires some effort on the requestor side but easy to verify for the proof-of-work system. In other embodiments, the challenge or problem may involve providing information that has been pre-arranged or agreed upon between the user and the login service. For example, the challenge may involve providing a current time of day or current date.

One drawback, however, is that challenge-response tests may unnecessarily impact legitimate users of the system. Furthermore, there is no way to flexibly match the difficulty of a proof-of-work challenge with the risk associated with an access request. The risk associated with an access request may be associated with a number of factors such as the length of the password. For example, a password with four characters may be relatively easy to guess because of the small number of combinations required to eventually guess the password. The risk in this case may be considered to be high. Another factor may be the number of consecutive attempts to access the requested resource. For example, five previous access requests in a short period of time, each with incorrectly entered passwords, may indicate a higher risk that the attempts are illegitimate. Finally, some geographic locations may be more highly correlated with illegitimate access requests and thus a higher risk.

Figure 3:
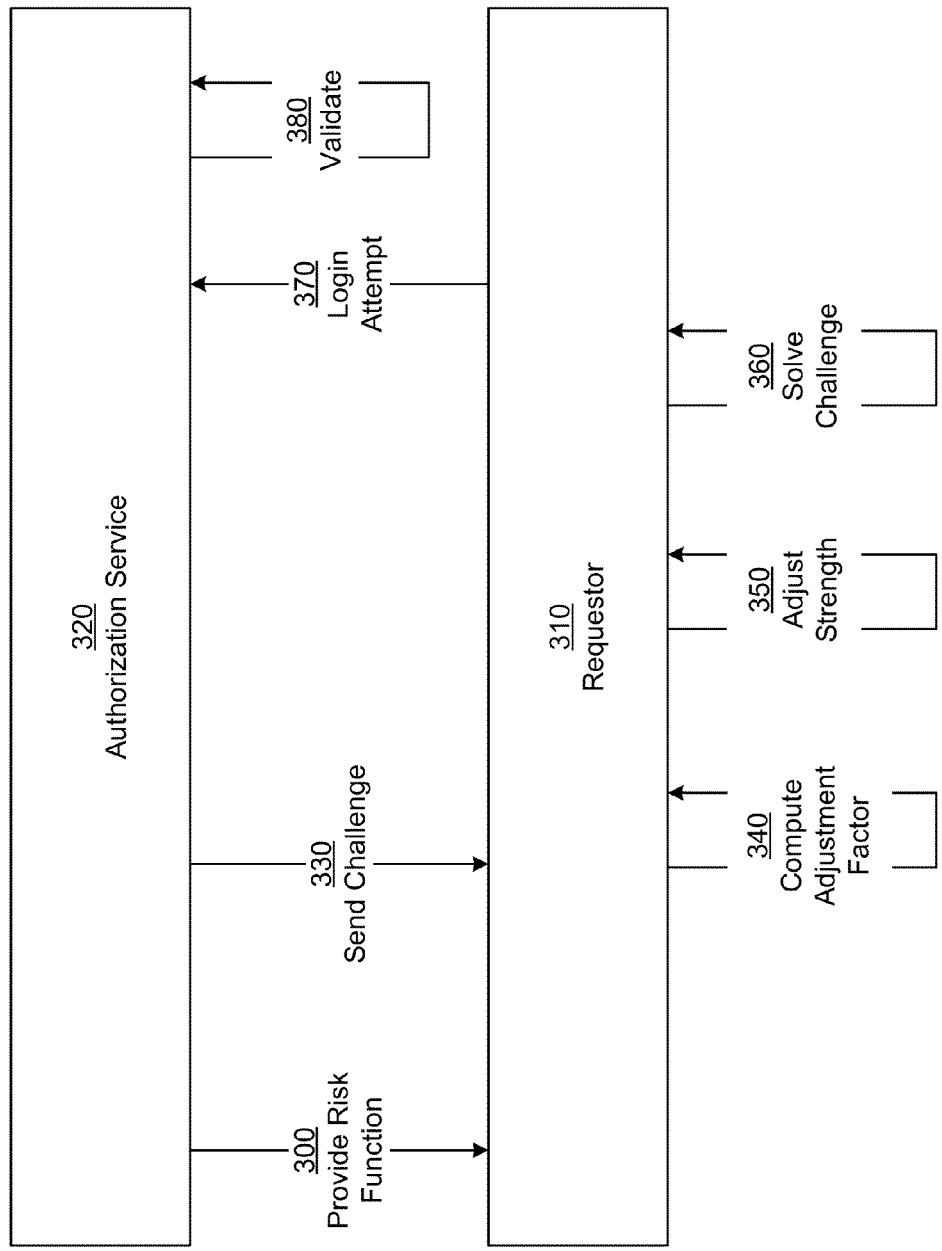
FIG. 3 is a diagram illustrating a risk-based authentication service in accordance with the present disclosure.

In various embodiments described herein, systems and methods are described for implementing a risk-based authentication service. FIG. 3 illustrates an exemplary method for authenticating a request for access to a resource associated with a password.

Referring to FIG. 3, operation 300 illustrates that an authentication service 320 may publish or otherwise make available a risk function such as risk function 200 depicted in FIG. 2. The risk function 200 may be used to score the riskiness of an access attempt. The authentication service 320 may correspond to login service 110 depicted in FIGS. 1 and 2. In one embodiment, the authentication service 320 may be provided by a login service 110 and a user may attempt to access a resource. The user may interact with a client executing on a computing device for communicating with the login service 110. In this example, such a client may be represented by requestor 310. The login service 110 may publish the risk function 200 through an out-of-band mechanism, such as by documenting the risk function 200 via public documentation, or through an in-band mechanism, such as by transmitting the risk function 200 to the requestor 310 during the login attempt.

In one embodiment, the login service 110 may publish the risk function 200 by transmitting a JavaScript function or some other script or executable code to a requestor during a login attempt. For example, the login service 110 may include the function as part of a web page for displaying a login prompt. The requestor 310 may evaluate the risk function 200 by executing the function, such as during a form submission.

Operation 330 illustrates that the requestor 310 may receive, from the login service 110, a proof-of-work challenge. As described above, the proof-of-work challenge may be a randomly generated proof-of-work challenge expressed at a base strength. The proof-of-work challenge may correspond to verification function 220 depicted in FIG. 2. The proof-of-work challenge may be any function that requires some computation effort by the requestor and can be used to deter illicit access attempts, malicious attacks such as denial-of-service attacks, and other unwanted activities such as spamming. The proof-of-work challenge may require some work from the requestor 310, typically requiring processing resources. One property of such a proof-of-work challenge may be that the challenge is asymmetrical. The proof-of-work challenge may require some computational effort by the requestor 310 but may be easy to verify by the login service 110. The requestor 310 may receive the proof-of-work challenge as part of initiating a login attempt, such as by including the proof-of-work challenge as part of a web page that provides a user interface for the login prompt.

In one embodiment, the proof-of-work challenge may require finding a partial collision of results for a non-invertible function. A non-invertible function is a function that does not have an easily computed inverse function that can undo the original function. In this example, the proof-of-work challenge may involve finding an input X for a given function F such that the prefix of the result F(X) matches a bit pattern chosen by the login service 110. The bit pattern may be randomly generated for each login attempt to prevent work from being cached or replayed. As another example, the proof-of-work challenge may involve finding an input X for a given function F and a given prefix P such that the prefix of the result F(P $ X) is a certain number of 0 bits where P $ X represents the concatenation of P and X.

In one embodiment, the function F may be a secure hash function such as SHA-1, and the strength of the proof-of-work challenge may be the number of bits B for the length of the result prefix. The strength of the proof-of-work challenge may also be expressed as an expected number of guesses to find a partial collision $2^B$.

In another embodiment, the function F may be an iterative hash function, such as bcrypt, and the strength of the proof-of-work challenge may be characterized by multiple parameters: the number of rounds R for the hash function and the number of bits B for the length of the result prefix. The strength of the proof-of-work challenge may also be expressed as an expected number of hash rounds to find a partial collision $R*(2^B)$.

Operation 340 illustrates that the requestor 310 may evaluate the risk function 200 based at least in part on a password that the requestor 310 will use for a login attempt. For example, the requestor 310 may prompt a user to enter a password for a login attempt. The requestor 310 may execute the risk function 200 on the entered password to compute a numerical adjustment factor A. The adjustment factor may correspond to one of the levels for verification function 220 depicted in FIG. 2. The adjustment factor may represent a risk associated with the login attempt with a small adjustment factor representing small additional risk and a large adjustment factor representing a large additional risk.

The adjustment factor may be based using the entered password rather than the correct password. Using an incorrect adjustment factor may cause the login attempt to fail validation but the requestor 310 may receive no indication of the true adjustment factor to use so as to avoid revealing information about the secret password.

In one embodiment, the execution of the risk function 200 may determine a risk score based on the complexity of the entered password. For example, the risk function 200 may start with a base risk score 0. The risk function may include a number of complexity tests, such as a test for the length of the password, a test for inclusion of special characters in the password, and so on. The risk function 200 may increase the base risk score by 1 for each failed test.

In another embodiment, the execution of the risk function 200 may determine the entropy of the entered password. For example, the risk function 200 may estimate the number of bits of entropy E1 present in the entered password. Entropy may be contextually considered, such as by assigning an entropy contribution based on weighted character bigrams derived from the English text. The risk function 200 may have a desired target number of bits of entropy E2 indicative of a secure password. The risk function 200 may be E2-E1 if the number of bits of entropy needs to be increased to constitute a secure password or 0 if the entered password already has sufficient entropy.

Operation 350 illustrates that the requestor 310 may increase the strength of the proof-of-work challenge based on the risk function result. In one embodiment, the requestor 310 may add the adjustment factor to the base strength of the proof-of-work challenge. For example, the requestor 310 may increase the number of bits B by the adjustment factor 0.8*A or may increase the number of rounds R by $(5/3)^A$.

In some embodiments, the risk function 200 may include a schedule specifying the distribution of adjustment factors amongst various adjustable parameters. For example, the schedule may include an oracle parameter that controls the ratio of work required to produce a solution to the work required to verify a solution. The schedule may include an effort parameter that controls the ratio of the rate at which special-purpose hardware can produce a solution to the rate at which general-purpose hardware can produce a solution. For each increment of adjustment the schedule may specify whether the increment should be applied to the oracle parameter or to the effort parameter. The login service 110 may construct the schedule based on security factors and user experience concerns for passwords of various strengths.

Operation 360 illustrates that the requestor 310 may solve the proof-of-work challenge. The requestor 310 may expend a moderate amount of computing effort to find a solution X satisfying the challenge problem. The computing effort may be probabilistically characterized by the strength of the proof-of-work challenge.

Operation 370 illustrates that the requestor 310 may send the login attempt to the login service 110 including the solution to the proof-of-work challenge. The requestor 310 may transmit the login attempt to the login service 110 including the value of the solution X. For example, the requestor 310 may add the solution as a request header of the login attempt or as a hidden form field during the submission of a login form.

Operation 380 illustrates that the login service 110 may validate the login attempt and the solution. In one embodiment, the login service 110 may look up a stored adjustment factor A' for the username associated with the login attempt. The login service 110 may validate that the solution X correctly solves the challenge problem based on using the stored adjustment factor A'. For example, rather than evaluating the risk function for the login attempt, the login service 110 may pre-compute an adjustment factor at an earlier time, such as when the password is initially selected, and save the adjustment factor to storage such as user login data store 210 in FIG. 2.

The examples illustrated in FIGS. 1-3 describe embodiments in the context of a login infrastructure configured to authenticate users who are attempting to access computing resources via a web interface. However, the described principles may be used to provide authentication services in other contexts such as, for example, authentication services using access mechanisms other than a web interface.

Figure 4:
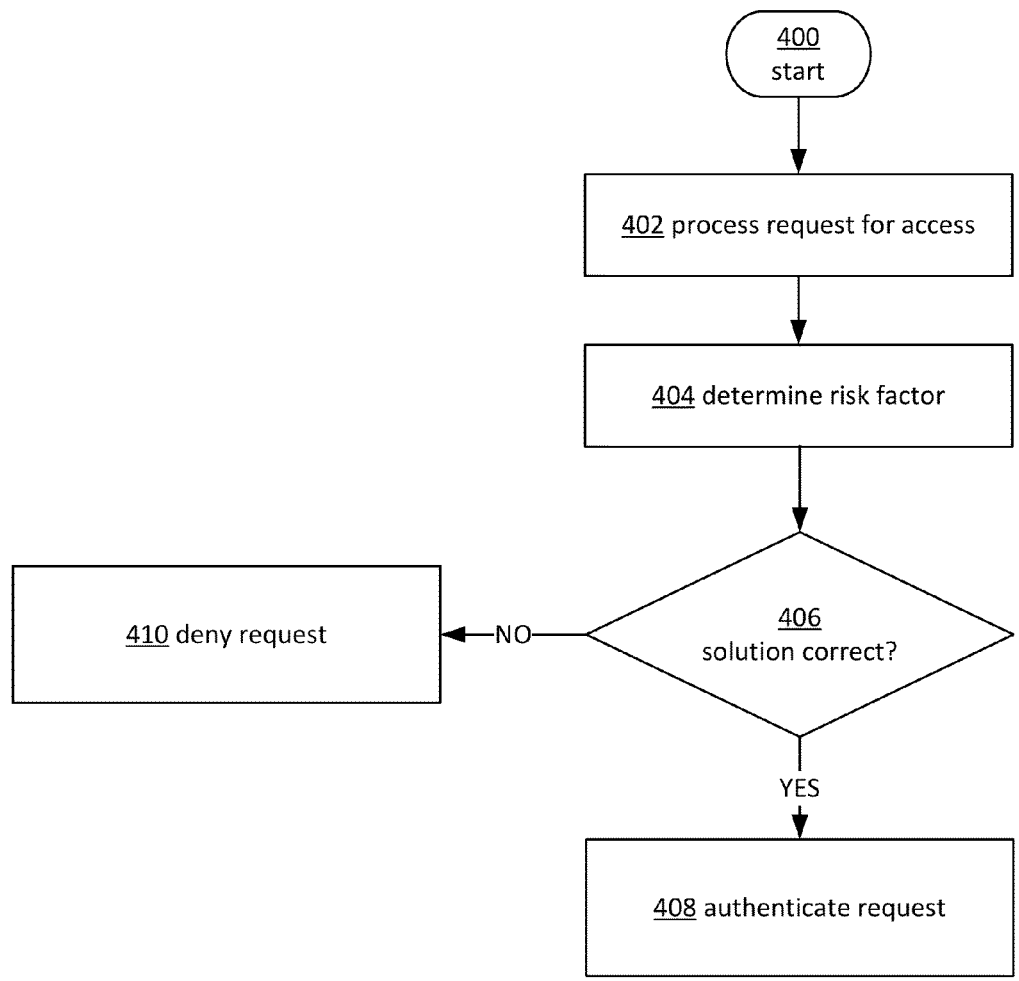
FIG. 4 is a flowchart of one embodiment of a process for providing a risk-based authentication service.

FIG. 4 illustrates an example operational procedure for authenticating a request for access to a resource associated with a password. Referring to FIG. 4, operation 400 begins the operational procedure. Operation 400 may be followed by operation 402. Operation 402 illustrates processing a request for access to the resource. In one embodiment, the request may be received by at least one computing device that implements an authentication service. The request may comprise a selected password. The selected password may be a password entered or selected by a user during the login attempt. The request may also comprise a solution to a verification function having a complexity that is determined based at least on a determined risk factor. The verification function may be a proof-of-work challenge as described above. In one embodiment, the determined risk factor may be determined at least in part as a function of the selected password. Operation 402 may be followed by operation 404. Operation 404 illustrates independently determining the risk factor based at least in part on a valid password.

Operation 404 may be followed by operation 406. Operation 406 illustrates determining whether the solution to the verification function received in the request is correct based on the independently determined risk factor. If the solution to the verification function received in the request is correct, then operation 406 may be followed by operation 408. Operation 408 illustrates authenticating the request. If the solution to the verification function received in the request is not correct, then operation 406 may be followed by operation 410. Operation 410 illustrates denying the request.

Figure 5:
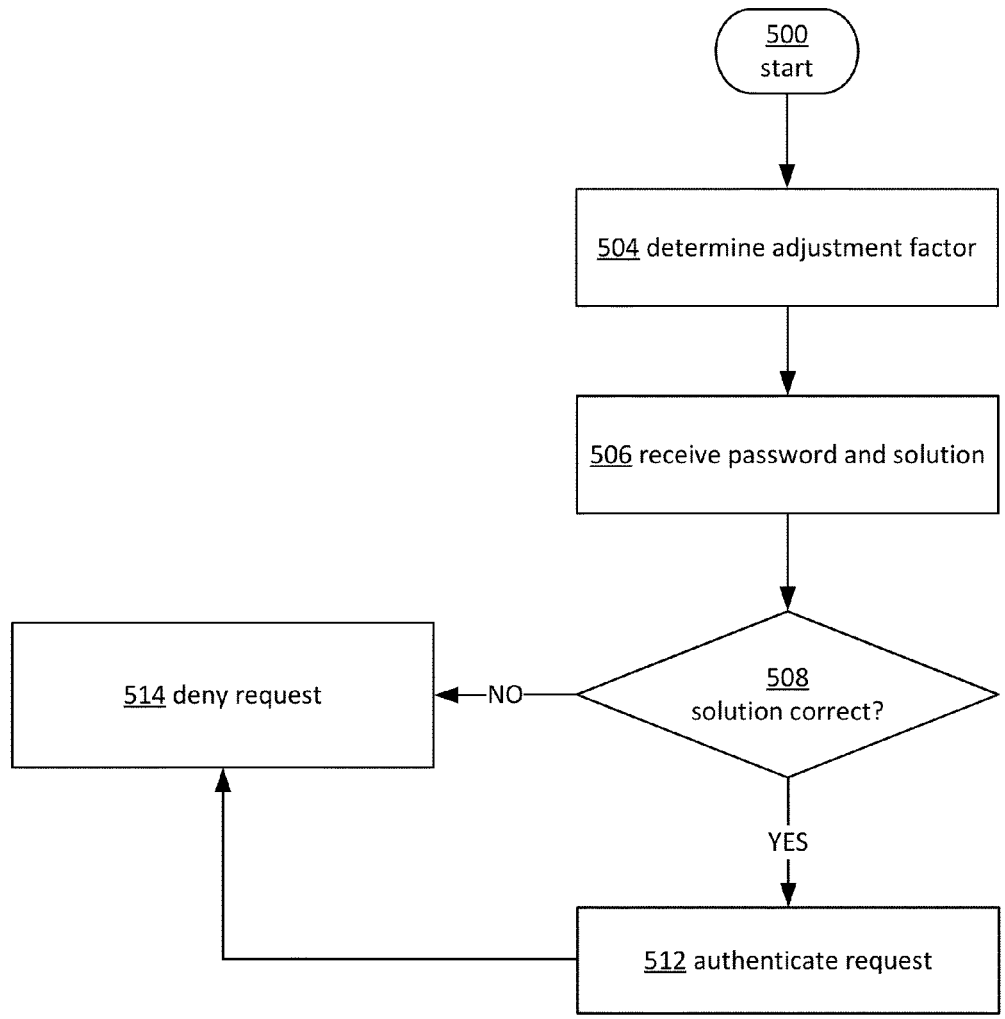
FIG. 5 is a flowchart of one embodiment of a process for providing a risk-based authentication service.

FIG. 5 illustrates an example operational procedure for authenticating a request to access a resource. Referring to FIG. 5, operation 500 begins the operational procedure. Operation 500 may be followed by operation 504. Operation 504 illustrates determining an adjustment factor associated with the user. In one embodiment, the adjustment factor may be generated at least in part as a function of a password associated with the user and the requested resource. The adjustment factor may correspond to a base level or a complexity level to the proof-of-work challenge as described above. The proof-of-work challenge may have a complexity level that is determined based at least in part on the adjustment factor.

Operation 504 may be followed by operation 506. Operation 506 illustrates receiving a selected password from the user and a solution to the proof-of-work challenge. Operation 508 illustrates determining whether the received solution is correct based on the determined adjustment factor. For example, the received solution may be verified as the correct solution to the proof-of-work challenge adjusted by the adjustment factor associated with the user. In one embodiment, a stored adjustment factor for the user may be accessed. If the received solution is correct based on the determined adjustment factor, then operation 508 may be followed by operation 512. Operation 512 illustrates authenticating the request when the solution received is determined to be correct if the received solution is not correct based on the determined adjustment factor, then operation 508 may be followed by operation 514. Operation 514 illustrates denying the request.

Figure 6:
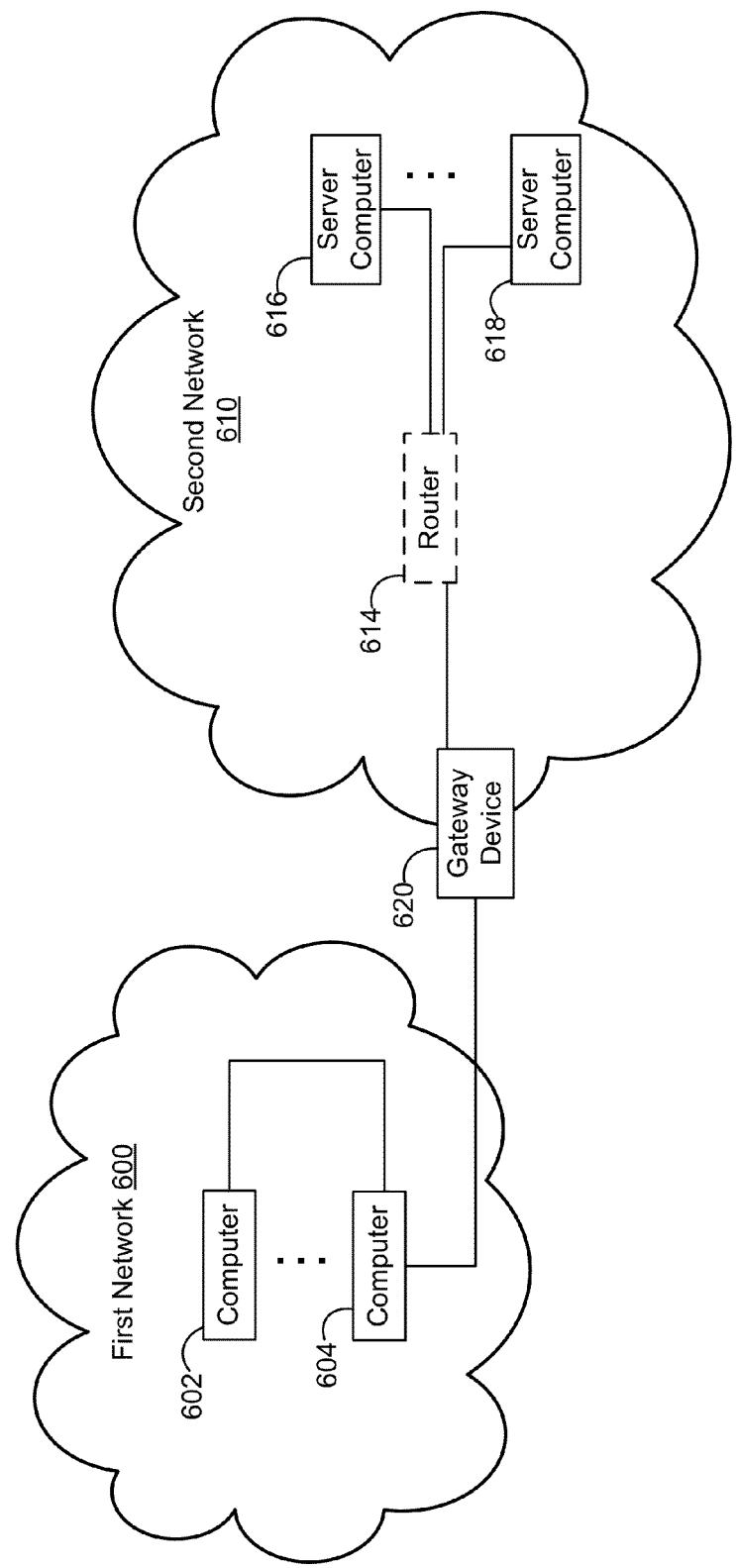
FIG. 6 is a block diagram illustrating an exemplary computer system that may be used in some embodiments.

FIG. 6 illustrates one example of an environment including a group of computing systems in which aspects of the present disclosure may be implemented. As shown in FIG. 6, the example includes a second network 610 that includes server computers 616 and 618. In particular, second network 610 may be connected to a first network 600 external to second network 610. First network 600 may provide access to computers 602 and 604.

First network 600 may be, for example, a publicly accessible network made up of multiple networks operated by various entities such as the Internet. Second network 610 may be, for example, a company network that is wholly or partially inaccessible from computing systems external to second network 610. Computers 602 and 604 may include, for example, home computing systems that connect directly to the Internet (e.g., via a cable modem or a Digital Subscriber Line (DSL)).

In addition to server computers 616 and 618 of second network 610, second network 610 may include a gateway 620 as discussed above. Second network 610 may further include additional networking devices such as a router 614. Router 614 may manage communications within second network 610, for example by forwarding packets or other data communications as appropriate based on characteristics of such communications (e.g., header information including source and/or destination addresses, protocol identifiers, etc.) and/or the characteristics of the second network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

Referring to FIG. 6, server computers 616 and 618 are part of second network 610, and each server computer may be assigned a network address (not shown) in accordance with second network 610. For example, the second network addresses may be unique with respect to the second network but not guaranteed to be unique with respect to other computing systems that are not part of second network 610. As one example, Internet Protocol (IP) and other networking protocols may reserve groups or blocks of network addresses, with such reserved network addresses not being routable over networks external to the second network 610. In such situations, different networks may each use the same network addresses within their networks, as the network addresses are locally unique to each network, but those network addresses may not be used for communications between a computing system of a different network and another computing system external to the network. IP addresses are used to illustrate some example embodiments in the present disclosure. However, it should be understood that other network addressing schemes may be applicable and are not excluded from the scope of the present disclosure.

In this example, to facilitate communications between server computers 616 and 618 of second network 610 and other external computing systems that are not part of second network 610 (e.g., computers 602 and 604 and/or other computing systems that are part of first network 600), one or more gateway devices 620 may be used. In particular, one or more first network 600 addresses (not shown) may have previously been assigned for use in representing second network 610. Such first network addresses may be routable over the Internet such that a communication that is sent by external computer 602 and that has one of second network 610's first network addresses as its destination network address will be routed over the Internet to gateway device 620. Furthermore, additional gateway devices (not shown) may be provided as needed.

Gateway device 620 may operate to manage both incoming communications to the second network 610 from first network 600 and outgoing communications from second network 610 to first network 600. For example, if server computer 616 sends a message (not shown) to one of computers 602 in first network 600, server computer 616 may create an outgoing communication that includes an external first network address (e.g., a public IP address) for computer 602 as the destination address and include a second network address (e.g., a private IP address) for server computer 616 as the source network address. Router 614 then uses the destination address of the outgoing message to direct the message to gateway device 620 for handling. In particular, in order to allow computer 602 to reply to the outgoing message, gateway device 620 may temporarily map one of the public network addresses for second network 610 to server computer 616 and modify the outgoing message to replace the source network address with the mapped first network address. Gateway device 620 may then update its mapping information with the new mapping, and forward the modified outgoing message to the destination computer 602 over the Internet.

If computer 602 responds to the modified outgoing message by sending a response incoming message (not shown) that uses the mapped first network address for server computer 616 as the destination network address, the response incoming message may be directed over the Internet to gateway device 620. Gateway device 620 may then perform similar processing in reverse to that described above for the outgoing message. In particular, gateway device 620 may use its mapping information to translate the mapped first network address into the second network address of server computer 616, modify the destination network address of the response incoming message from the mapped first network address to the second network address of server computer 616, and forward the modified incoming message to server computer 616. In this manner, at least some of the internal computers of second network 610 may communicate with external computing systems via temporary use of the first network addresses. Furthermore, in some situations, one or more of the internal computing systems of second network 610 may be mapped to use one of the first network addresses (e.g., to a unique combination of a first network address and a port number), such that external computing systems may initiate new incoming messages to the internal computing system by directing the new incoming messages to the mapped representative first network address/port as the destination network address of the new incoming messages.

Figure 7:
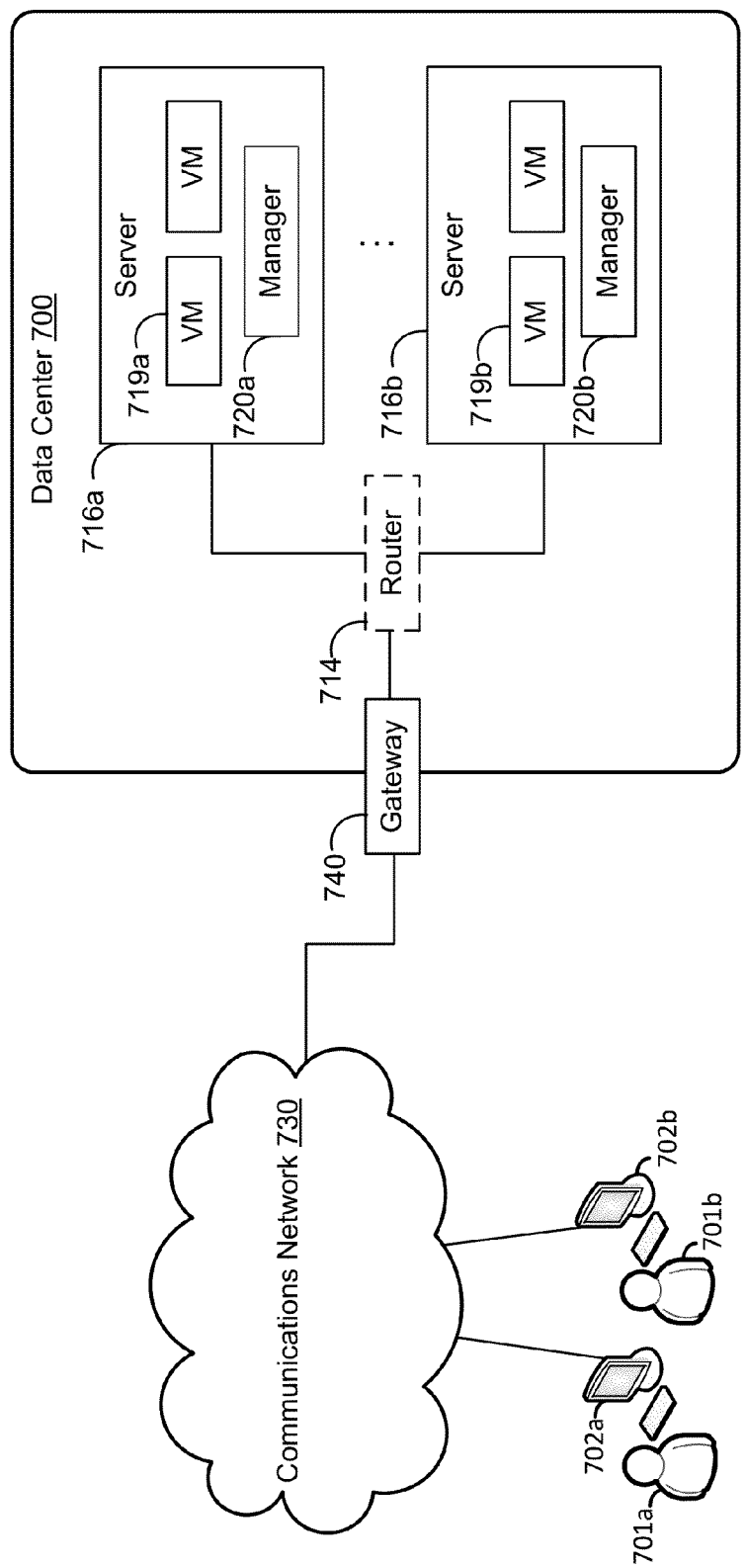
FIG. 7 is a block diagram illustrating an exemplary computer system that may be used in some embodiments.

FIG. 7 depicts an example computing environment wherein aspects of the present disclosure can be implemented. Referring to FIG. 7, communications network 730 may, for example, be a publicly accessible network of linked networks and possibly operated by various distinct parties, such as the Internet. In other embodiments, communications network 730 may be a private network, such as, for example, a corporate or university network that is wholly or partially inaccessible to non-privileged users. In still other embodiments, communications network 730 may include one or more private networks with access to and/or from the Internet.

Communication network 730 may provide access to computers 702. User computers 702 may be computers utilized by customers 701 or other customers of data center 700. For instance, user computer 702a or 702b may be a server, a desktop or laptop personal computer, a tablet computer, a wireless telephone, a personal digital assistant (PDA), an e-book reader, a game console, a set-top box, or any other computing device capable of accessing data center 700. User computer 702a or 702b may connect directly to the Internet (e.g., via a cable modem or a Digital Subscriber Line (DSL)). Although only two user computers 702a and 702b are depicted, it should be appreciated that there may be multiple user computers.

User computers 702 may also be utilized to configure aspects of the computing resources provided by data center 700. In this regard, data center 700 might provide a Web interface through which aspects of its operation may be configured through the use of a Web browser application program executing on user computers 702. Alternatively, a stand-alone application program executing on user computers 702 might access an application programming interface (API) exposed by data center 700 for performing the configuration operations. Other mechanisms for configuring the operation of the data center 700, including deploying updates to an application, might also be utilized.

Servers 716 shown in FIG. 7 may be standard servers configured appropriately for providing the computing resources described above and may provide computing resources for executing one or more applications. In one embodiment, the computing resources may be virtual machine instances 719. In the example of virtual machine instances 719, each of the servers 716 may be configured to execute an instance manager 720a or 720b capable of executing the virtual machine instances 719. The instance managers 720 may be a virtual machine monitor (VMM) or another type of program configured to enable the execution of virtual machine instances 719 on servers 716, for example. As discussed above, each of the virtual machine instances 719 may be configured to execute all or a portion of an application.

It should be appreciated that this example describes a computing environment providing virtual machine instances, other types of implementations can be utilized with the concepts and technologies disclosed herein. For example, the embodiments disclosed herein might also be utilized with computing systems that do not utilize virtual machine instances.

In the example data center 700 shown in FIG. 7, a router 714 may be utilized to interconnect the servers 716a and 716b. Router 714 may also be connected to gateway 740 which is connected to communications network 730. Router 714 may manage communications within networks in data center 700, for example by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In some embodiments, one or more of the virtual machine instances 719 of data center 700 may form part of one or more networks. In some embodiments, gateway 740 may be used to provide network address translation (NAT) functionality to a group of virtual machine instances and allow the virtual machine instances of the group to use a first group of internal network addresses to communicate over a shared internal network and to use a second group of one or more other external network addresses for communications between virtual machine instances of the group and other computing systems or virtual machine instances that are external to the group. An IP address is one example of a network address that is particularly applicable to the TCP/IP context in which some embodiments of the present disclosure can be implemented. The use of IP addresses herein is intended to be illustrative of network addresses and not limiting as to the scope of the described concepts.

Virtual machine instances 719 may be assigned a private network address (not shown). For example, the private network addresses may be unique with respect to their respective private networks but not guaranteed to be unique with respect to other computing systems that are not part of the private network. IP addresses are used to illustrate some example embodiments in the present disclosure. However, it should be understood that other network addressing schemes may be applicable and are not excluded from the scope of the present disclosure.

Gateway 740 may operate to manage both incoming communications to data center 700 from communication network 730 and outgoing communications from data center 700 to communication network 730. For example, if virtual machine instance 719a sends a message (not shown) to computer 702a, virtual machine instance 719a may create an outgoing communication that includes network address on a first network (e.g., an external public IP address) for computer 702a as the destination address and include a network address on a second network (e.g., a private IP address) for virtual machine instance 719a as the source network address. Router 714 may then use the destination address of the outgoing message to direct the message to gateway 740 for handling. In particular, in order to allow computer 702a to reply to the outgoing message, gateway 740 may temporarily map one of the public network addresses for data center 700 to virtual machine instance 719a and modify the outgoing message to replace the private network address for the source network address with the mapped public network address. Gateway 740 may then update its mapping information with the new mapping, and forward the modified outgoing message to computer 702a over the Internet.

If computer 702a responds to the modified outgoing message by sending a response incoming message (not shown) that uses the mapped public network address for virtual machine instance 719a as the destination network address, the response incoming message may be directed over the Internet to gateway 740. Gateway 740 may then perform similar processing in reverse to that described above for the outgoing message. In particular, gateway 740 may use its mapping information to translate the mapped public network address into the private network address of virtual machine instance 719a, modify the destination network address of the response incoming message from the mapped public network address to the private network address of virtual machine instance 719a, and forward the modified incoming message to virtual machine instance 719a. In this manner, at least some of the internal computers of data center 700 may communicate with external computing systems via temporary use of the public network addresses. Furthermore, in some situations, one or more of the internal computing systems of data center 700 may be mapped to use one of the public network addresses (e.g., to a unique combination of a public network address and a port number), such that external computing systems may initiate new incoming messages to the internal computing system by directing the new incoming messages to the mapped representative public network address/port as the destination network address of the new incoming messages.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 700 described in FIG. 7 is merely illustrative and that other implementations might be utilized. Additionally, it should be appreciated that the functionality disclosed herein might be implemented in software, hardware, or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 8:
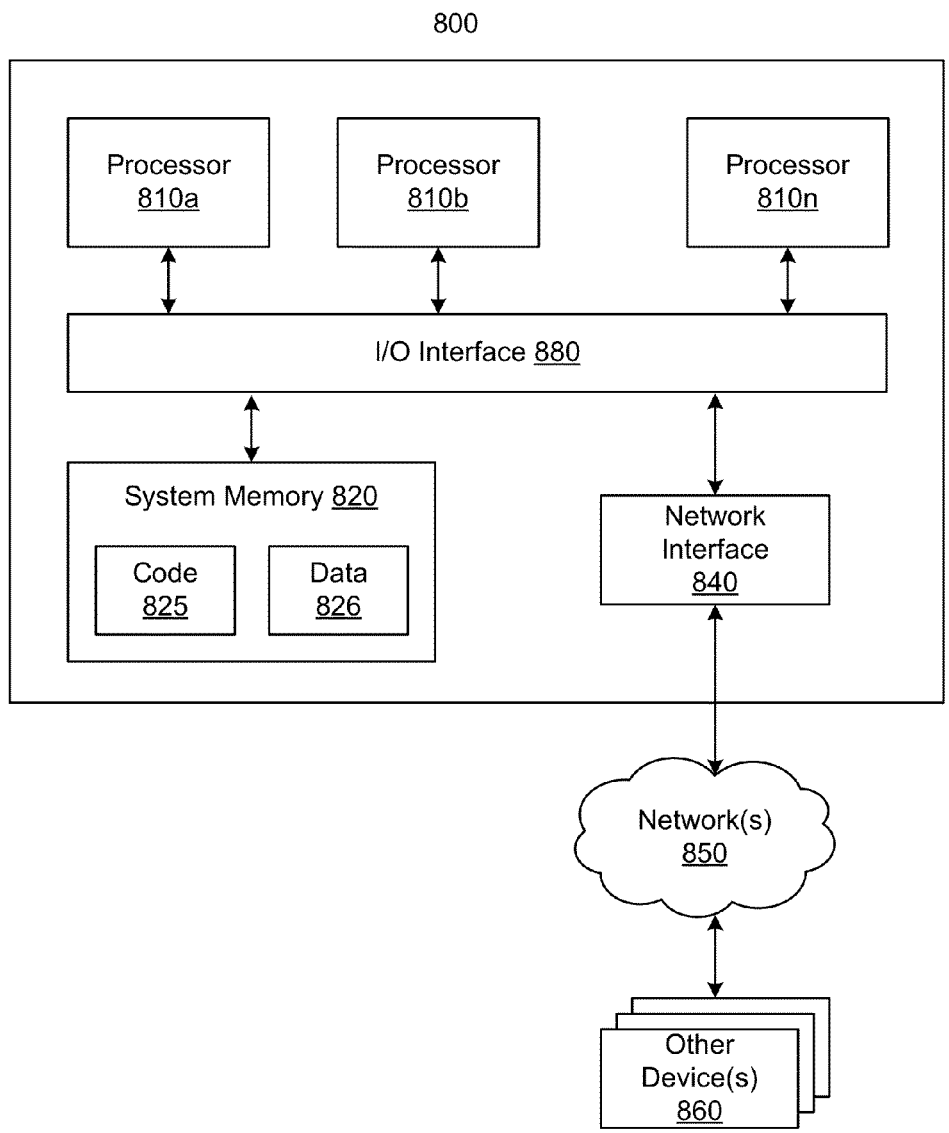
FIG. 8 is a block diagram illustrating an exemplary computing device that may be used in some embodiments.

In at least some embodiments, a server that implements a portion or all of one or more of the technologies described herein, including the techniques for providing a risk-based authentication service may include a general-purpose computer system that includes or is configured to access one or more computer-accessible media. FIG. 8 illustrates such a general purpose computing device 800. In the illustrated embodiment, computing device 800 includes one or more processors 810a, 810b, and/or 810n (which may be referred herein singularly as "a processor 810" or in the plural as "the processors 810") coupled to a system memory 820 via an input/output (I/O) interface 880. Computing device 800 further includes a network interface 840 coupled to I/O interface 880.

In various embodiments, computing device 800 may be a uniprocessor system including one processor 810 or a multiprocessor system including several processors 810 (e.g., two, four, eight or another suitable number). Processors 810 may be any suitable processors capable of executing instructions. For example, in various embodiments, processors 810 may be general-purpose or embedded processors implementing any of a variety of instruction set architectures (ISAs), such as the x86, PowerPC, SPARC, or MIPS ISAs or any other suitable ISA. In multiprocessor systems, each of processors 810 may commonly, but not necessarily, implement the same ISA.

System memory 820 may be configured to store instructions and data accessible by processor(s) 810. In various embodiments, system memory 820 may be implemented using any suitable memory technology, such as static random access memory (SRAM), synchronous dynamic RAM (SDRAM), nonvolatile/Flash-type memory or any other type of memory. In the illustrated embodiment, program instructions and data implementing one or more desired functions, such as those methods, techniques and data described above, are shown stored within system memory 820 as code 825 and data 826.

In one embodiment, I/O interface 880 may be configured to coordinate I/O traffic between processor 810, system memory 820 and any peripheral devices in the device, including network interface 840 or other peripheral interfaces. In some embodiments, I/O interface 880 may perform any necessary protocol, timing or other data transformations to convert data signals from one component (e.g., system memory 820) into a format suitable for use by another component (e.g., processor 810). In some embodiments, I/O interface 880 may include support for devices attached through various types of peripheral buses, such as a variant of the Peripheral Component Interconnect (PCI) bus standard or the Universal Serial Bus (USB) standard, for example. In some embodiments, the function of I/O interface 880 may be split into two or more separate components, such as a north bridge and a south bridge, for example. Also, in some embodiments some or all of the functionality of I/O interface 880, such as an interface to system memory 820, may be incorporated directly into processor 810.

Network interface 840 may be configured to allow data to be exchanged between computing device 800 and other device or devices 860 attached to a network or networks 850, such as other computer systems or devices as illustrated in FIGS. 6 and 7, for example. In various embodiments, network interface 840 may support communication via any suitable wired or wireless general data networks, such as types of Ethernet networks, for example. Additionally, network interface 840 may support communication via telecommunications/telephony networks such as analog voice networks or digital fiber communications networks, via storage area networks such as Fibre Channel SANs or via any other suitable type of network and/or protocol.

In some embodiments, system memory 820 may be one embodiment of a computer-accessible medium configured to store program instructions and data as described above for FIGS. 1 through 7 for implementing embodiments of the corresponding methods and systems. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 800 via I/O interface 880. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 800 as system memory 820 or another type of memory. Further, a computer-accessible medium may include transmission media or signals such as electrical, electromagnetic or digital signals, conveyed via a communication medium such as a network and/or a wireless link, such as may be implemented via network interface 840. Portions or all of multiple computing devices such as those illustrated in FIG. 8 may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

It will be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc.

In some embodiments, a system memory may be used which is one embodiment of a computer readable storage medium configured to store program instructions and data as described above for FIGS. 1-8 for implementing embodiments of the corresponding methods and apparatus. Portions or all of the multiple computer systems such as those illustrated herein may be used to implement the described functionality in various embodiments; for example, software components running on a variety of different devices and servers may collaborate to provide the functionality.

It will be appreciated that in some embodiments the functionality provided by the routines discussed above may be provided in alternative ways, such as being split among more routines or consolidated into fewer routines. Similarly, in some embodiments, illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, in other embodiments the operations may be performed in other orders and in other manners. Similarly, the data structures discussed above may be structured in different ways in other embodiments, such as by having a single data structure split into multiple data structures or by having multiple data structures consolidated into a single data structure, and may store more or less information than is described (e.g., when other illustrated data structures instead lack or include such information respectively, or when the amount or types of information that is stored is altered).

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of the inventions disclosed herein.

What is claimed is:

1. A computer-implemented method for authenticating a request to access a resource, comprising:
   in response to receiving a request for access to a resource from a user, determining a base adjustment factor associated with the user, the base adjustment factor determined at least in part as a function of a saved password associated with the user and the requested resource, and wherein the base adjustment factor is indicative of a base complexity of a proof-of-work challenge for accessing the resource;
   sending to the user the proof-of-work challenge, the proof-of-work challenge generated based on the base adjustment factor;
   receiving from the user a solution to the proof-of-work challenge and an entered password, the solution determined at least in part by adjusting a complexity of the proof-of-work challenge based on a risk factor that is indicative of a risk associated with the entered password; and
   authenticating the request when the solution received is determined to be correct based at least in part on the proof-of-work challenge and the entered password.

2. The method according to claim 1, wherein the proof-of-work challenge comprises executable code.

3. The method according to claim 1, wherein the proof-of-work challenge is based at least in part on a time of day.

4. The method according to claim 1, wherein the adjustment factor is determined based at least in part on a risk function configured to correlate the entered password with the adjustment to the complexity of the proof-of-work challenge.

5. The method according to claim 4, further comprising transmitting data indicative of the risk function to the user in response to receiving the request.

6. The method according to claim 5, wherein the data is executable code.

7. The method according to claim 4, wherein the risk function is published.

8. The method according to claim 4, wherein the risk function is configured to associate the adjustment factor with a determined level of risk.

9. The method according to claim 4, wherein the risk function is configured to associate the adjustment factor with a complexity of the password associated with the user.

10. The method according to claim 4, wherein the risk function is configured to associate the adjustment factor with an entropy of the password associated with the user.

11. The method according to claim 4, wherein the risk function comprises a schedule specifying a distribution of adjustment factors among adjustable parameters.

12. The method according to claim 1, wherein the proof-of-work challenge comprises determination of a partial collision of results for a non-invertible function.

13. The method according to claim 1, wherein the proof-of-work challenge comprises a secure hash function.

14. The method according to claim 1, wherein the determining an adjustment factor comprises retrieving a pre-computed adjustment factor associated with the user.

15. A system for authenticating a request for access to a resource associated with an established password, the system comprising:
   at least one computing device; and
   at least one memory having stored thereon computer-readable instructions that, upon execution by the system, cause the system to at least:
   determine an adjustment factor based at least in part as a function of a password entered by a user and a resource requested by the user, and wherein the adjustment factor is usable to modify a complexity of a proof-of-work challenge;
   send to the user the proof-of-work challenge, the proof-of-work challenge generated based on the adjustment factor;
   receive from the user a solution to the proof-of-work challenge and an entered password; and
   authenticate the request when the received solution to the proof-of-work challenge is determined to be correct based at least in part on the adjustment factor and the entered password.

16. The system according to claim 15, wherein the proof-of-work challenge comprises executable code.

17. The system according to claim 15, wherein the adjustment factor is determined based at least in part on a risk function configured to correlate the password associated with the user with an adjustment to the complexity of the proof-of-work challenge.

18. The system according to claim 17, further comprising computer-readable instructions that, upon execution by the system, cause the system to transmit data indicative of the risk function to the user in response to receiving the request.

19. A non-transitory computer-readable storage medium having stored thereon computer-readable instructions, the computer-readable instructions comprising instructions that upon execution on a computing system, at least cause:
   receiving a request for access to a resource from a user;
   generating an adjustment factor associated with the user, the adjustment factor generated at least in part as a function of a password associated with the user and the requested resource, and wherein the adjustment factor is indicative of a complexity of a proof-of-work challenge having an adjustable complexity;
   sending to the user the proof-of-work challenge, the proof-of-work challenge generated based on the adjustment factor;
   receiving from the user a solution to the proof-of-work challenge and an entered password; and
   authenticating the request based at least in part on the solution and the entered password.

20. The computer-readable storage medium of claim 19, wherein the adjustment factor is determined based at least in part on a risk function configured to correlate the password associated with the user with an adjustment to the complexity of the proof-of-work challenge.

21. The computer-readable storage medium of claim 20, wherein the risk function is operable to associate the adjustment factor with a determined level of risk.

22. The computer-readable storage medium of claim 20, wherein the risk function is operable to associate the adjustment factor with a complexity of the password associated with the user.

23. The computer-readable storage medium of claim 20, wherein the risk function is operable to associate the adjustment factor with an entropy of the password associated with the user.

* * * * *